United States Patent
Rosen et al.

(10) Patent No.: US 7,171,158 B2
(45) Date of Patent: *Jan. 30, 2007

(54) SATELLITE COMMUNICATION SYSTEM USING LINEAR CELL TRACKING

(75) Inventors: Harold A. Rosen, Santa Monica, CA (US); Steven O. Lane, Rolling Hills Estate, CA (US); Robert E. Vaughan, Manhattan Beach, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 669 days.

This patent is subject to a terminal disclaimer.

(21) Appl. No.: 10/172,260

(22) Filed: Jun. 14, 2002

(65) Prior Publication Data

US 2002/0151274 A1 Oct. 17, 2002

Related U.S. Application Data

(63) Continuation of application No. 09/379,173, filed on Aug. 23, 1999, now Pat. No. 6,430,393.

(51) Int. Cl.
*H04B 7/185* (2006.01)

(52) U.S. Cl. .................. 455/12.1; 455/13.1; 455/13.3; 455/427; 455/428; 455/446; 370/316; 701/13

(58) Field of Classification Search ............... 455/13.1, 455/13.3, 12.1, 427, 428, 446; 370/316
See application file for complete search history.

(56) References Cited

U.S. PATENT DOCUMENTS 4,931,802 A  6/1990  Assal et al. ................. 342/356
5,408,237 A  4/1995  Patterson et al. ........... 342/354
5,548,294 A  8/1996  Sturza ........................ 342/372
5,634,190 A  5/1997  Wiedeman .................. 455/13.1
5,739,784 A  4/1998  Jan et al.
5,796,715 A  8/1998  Patterson et al. ........... 370/349
6,081,227 A * 6/2000  Haber et al. ................ 342/354
6,154,692 A  11/2000 Cielaszyk et al. ........... 701/13
6,233,466 B1 5/2001  Wong et al. ................. 455/562

FOREIGN PATENT DOCUMENTS

WO    WO 93/09614    5/1993
WO    WO 99/35766    7/1999

* cited by examiner

*Primary Examiner*—Matthew D. Anderson
*Assistant Examiner*—Yuwen Pan
(74) *Attorney, Agent, or Firm*—Georgann S. Grunebach

(57) ABSTRACT

An improved satellite communication device and system are provided. The satellite communication device uses yaw or roll-yaw steering to linearize angular track of uplink cells; one-dimensional linear "ratcheting" in an uplink antenna to maintain resource allocation of uplink cells along antenna columns; phased-array downlink antennas which can track earth-fixed downlink cells while compensating for the yaw (or roll-yaw) satellite steering; and variable rate TDMA service among downlink cells in a footprint. As a result, system overhead for performing new resource allocations between satellite handovers is minimized, thereby reducing resource management and increasing system capacity. Flexible bandwidth/capacity assignment of both uplink and downlink resources to earth locations via linear cell ratcheting, uplink RF peaking switch, and data-driven variable-TDMA downlink phased-arrays, is provided.

20 Claims, 10 Drawing Sheets

VELOCITY VECTORS IN SATELLITE'S (x,y) PLANE
$(v\sin(\alpha) - v_e, v\cos(\alpha))$

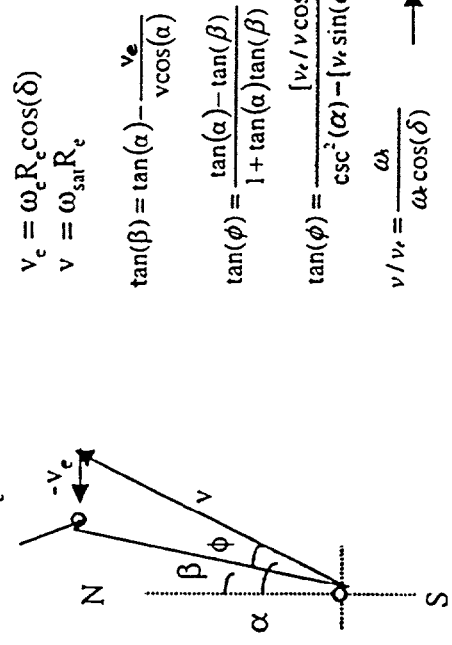

$\omega_s$ = Satellite's angular velocity
$\omega_e$ = Earth's rotation angular velocity
$v$ = Orbit angle (EC angle from ascending node to subsatellite point)
$\delta$ = latitude of subsatellite point
$i$ = orbit inclination
$\alpha$ = spherical triangle angle between satellite plane and subsatellite longitude plane
$D$ = Earth's rotation period (day) $(2\pi/D = \omega_e)$
$P$ = Satellite's orbit period $(2\pi/P = \omega_s)$ $v_e = \omega_e R_e \cos(\delta)$
$v = \omega_{sat} R_e$ $\tan(\beta) = \tan(\alpha) - \dfrac{v_e}{v\cos(\alpha)}$ $\tan(\phi) = \dfrac{\tan(\alpha) - \tan(\beta)}{1 + \tan(\alpha)\tan(\beta)} = \dfrac{[v_e/v\cos(\alpha)]}{1 + \tan^2(\alpha) - \tan(\alpha)[v_e/v\cos(\alpha)]}$ $\tan(\phi) = \dfrac{[v_e/v\cos(\alpha)]}{\csc^2(\alpha) - [v_e\sin(\alpha)/v\cos^2(\alpha)]} = \dfrac{(v_e/v)\cos(\alpha)}{1 - (v_e/v)\sin(\alpha)} = \dfrac{\cos(\alpha)}{(v/v_e) - \sin(a)}$ $v/v_e = \dfrac{\omega_s}{\omega_e \cos(\delta)} \qquad \tan(\phi) = \dfrac{\cot(\alpha)}{\left(\dfrac{\omega_s}{\omega_e \cos(\delta)\sin(\alpha)}\right) - 1}$

SPHERICAL TRIANGLE RELATIONSHIPS:
$\cos(i) = \cos(\delta)\sin(\alpha)$
$\cot(\alpha) = \tan(i)\cos(v)$ $\tan(\phi) = \dfrac{\tan(i)\cos(v)}{\left(\dfrac{\omega_s}{\omega_e \cos(i)}\right) - 1} = \dfrac{\sin(i)\cos(v)}{\left(\dfrac{\omega_s}{\omega_e}\right) - \cos(i)} \longrightarrow \tan(\phi) = \dfrac{\sin(i)\cos(2\pi t/P)}{\left(\dfrac{D}{P}\right) - \cos(i)}$

CIRCULAR ORBIT GEOMETRY

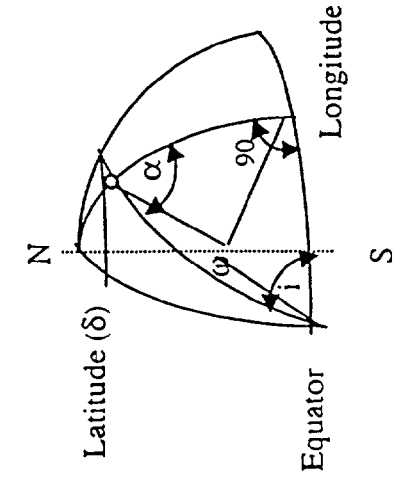

Fig. 4

SATELLITE COMMUNICATION SYSTEM USING LINEAR CELL TRACKING

CROSS-REFERENCE TO RELATED APPLICATION

This application is a continuation of prior application Ser. No. 09/379,173, filed Aug. 23, 1999 now U.S. Pat. No. 6,430,393, the entire contents of which are incorporated herein by this reference.

TECHNICAL FIELD OF THE INVENTION

The present invention relates in general to satellite communication systems and in particular to a satellite communication system using one-dimensional linear ratcheting in an uplink antenna.

BACKGROUND OF THE INVENTION

Satellite systems are well suited to cover large geographical areas and provide long distance wireless communication. Geostationary satellites work well to cover one specific area without any handoff overhead associated with satellite movement, however, geostationary orbits may be less convenient for low cost handheld terminals. Instead a series of low Earth orbit (LEO) satellites may be employed.

LEO satellite systems have the disadvantage that the satellite is in motion relative to the stationary or slowly moving user on or near the earth's surface. Users are usually grouped into cells depending on the user's geographic location. In the communications system, each cell is associated with a satellite antenna beam that transmits signals to or receives signals from the users located in a particular cell.

In prior art satellite systems, the cell-beam relationship can be described as either earth-fixed cells or satellite-fixed beams. In satellite-fixed beam systems, the beams point in fixed directions relative to the satellite body and thus sweep over the cells as the satellite moves through its orbit. As a result, the users must be reassigned to different beams frequently. There must be rapid reassignment calculations and frequent messages exchanged between the satellite and the user to coordinate the reassignment, leading to a significant overhead load on the system.

In earth-fixed cell systems, the satellite must continuously repoint the antenna beams to follow the motion of the cells as seen from the moving satellite. Implementing earth-fixed cells requires a very complex antenna that can steer many beams in two angular dimensions. Rapid reassignment calculations and overhead load are reduced at the expense of a vastly more complex antenna.

SUMMARY OF THE INVENTION

Accordingly, there is a need for an improved method and apparatus that eliminates the reassignment overhead and simplifies the antenna to a one-dimensional steering antenna.

In accordance with a first aspect of the invention, a satellite communication device is provided. The satellite communication device is preferably used in conjunction with a plurality of satellite communication devices in a non-geostationary satellite communications network. The device comprises one or more active beam forming uplink antennas employing linear cell tracking for capturing uplink signals containing data packets. Further the device comprises one or more downlink antennas capable of generating independently steerable downlink beams of data packets. Still further, the device comprises one or more intersatellite link transmitters/receivers for transmitting/receiving intersatellite data packets from a satellite in the plurality of satellite communication devices. The device also comprises a routing switch for routing data packets from an uplink antenna to a downlink antenna, from an uplink antenna to a intersatellite link transmitter, from a intersatellite link receiver to a downlink antenna, and from a intersatellite link receiver to a intersatellite link transmitter.

In a preferred embodiment, the device employs yaw or roll-yaw steering to linearize an angular track of cells through the satellite communication device footprint. Also in the preferred embodiment, the downlink antenna comprises a phased-array downlink antenna which compensates for yaw or roll-yaw satellite communication device steering. Further, the downlink antenna preferably steers downlink beams in conjunction with time division multiple access downlink formatting and provides variable rate time division multiple access service. Still further, the downlink antenna preferably steers downlink beams based on fixed cell earth addresses, wherein downlink data packets are inserted in a queue based on fixed cell earth addresses and queues are assigned to downlink beams steered to the fixed cell earth addresses in bursts. Additionally, the preferred embodiment includes an uplink antenna employing one-dimensional linear ratcheting to maintain resource allocation of uplink cells along antenna columns.

In some embodiments, the device further comprises a demodulator capable of recovering the uplink data packets from the uplink beams and a radio frequency switch matrix interconnecting the uplink beams to the demodulator. In such an instance, the radio frequency switch matrix is preferably commanded in conjunction with the linear ratcheting. Further, the routing switch may also route data packets from the demodulator to a downlink antenna, and from the demodulator to the intersatellite link transmitter.

BRIEF DESCRIPTION OF THE DRAWINGS

These and other features and advantages of the present invention will become more apparent from a detailed consideration of the following detailed description of certain preferred embodiments when taken in conjunction with the drawings in which:

FIG. 4 is a geometrical diagram and associated mathematical equations illustrating a yaw-steering and a roll-yaw steering program;

DETAILED DESCRIPTION OF THE PREFERRED EMBODIMENTS

Although the following description focuses on satellites, persons of ordinary skill in the art will readily appreciate that the techniques of the present invention are in no way limited to satellites. On the contrary, any communication system which might benefit from reduced resource management overhead and increased system capacity, may employ the techniques herein. Such systems might include terrestrial cellular communication systems, airborne cellular communication systems, or computer communication systems.

Figure 1:
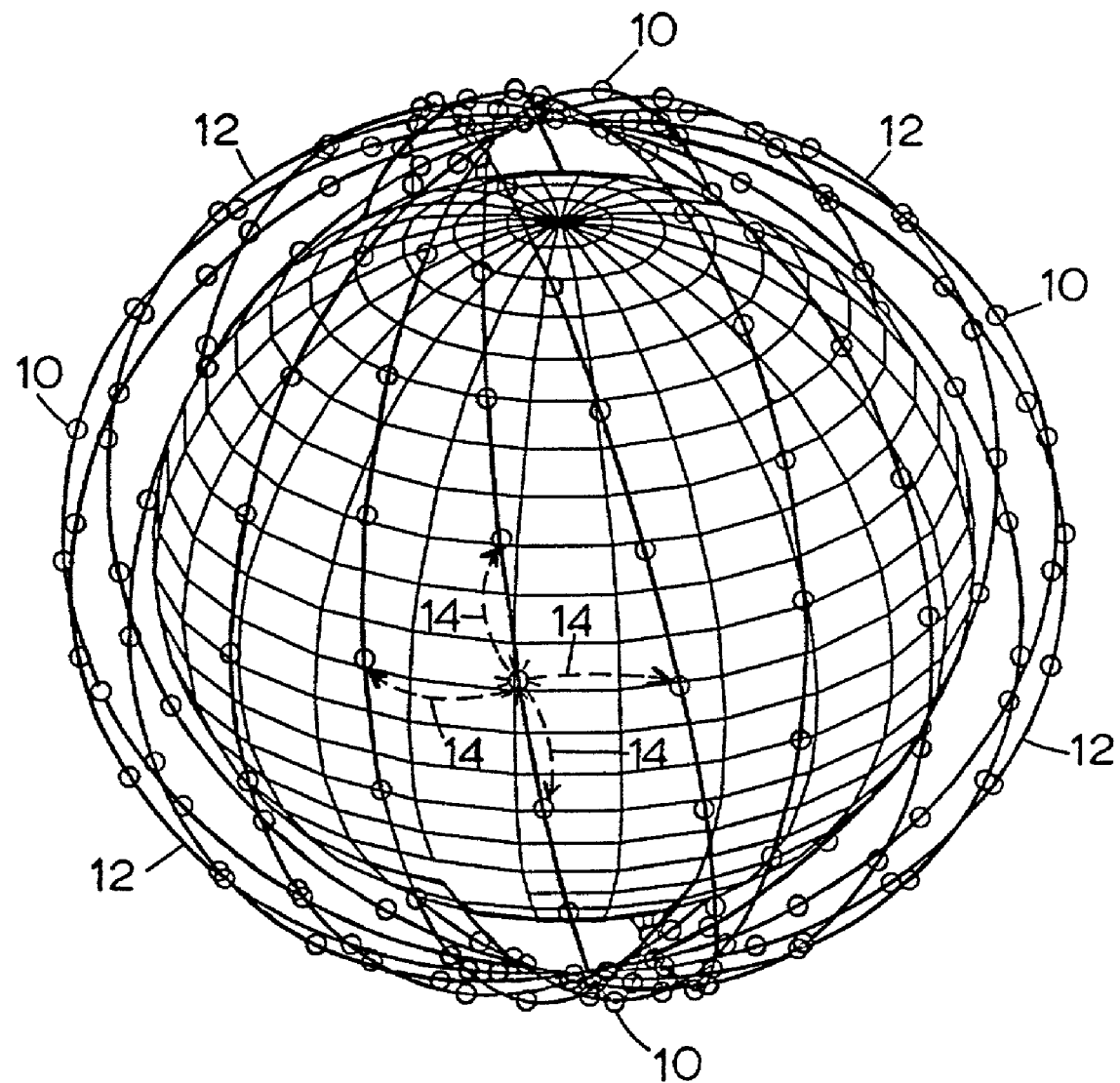
FIG. 1 illustrates a non-geostationary satellite communications system comprising a plurality of satellites in earth orbit.

A non-geostationary satellite communications system, comprising a plurality of satellites 10 located in earth orbit is illustrated in FIG. 1. This example constellation is in low-earth orbit at 1400 km altitude, has ten orbit planes 12 spaced at 18.5 degrees separation of ascending nodes, and is inclined 82 degrees from the equator into nearly polar orbits. There are twenty satellites 10 per plane 12. The constellation is connected by intersatellite links (ISLs) 14 in a variable configuration between the satellites 10. Preferably, ISL 14 interconnectivity includes four active ISLs 14 per satellite 10. One ISL 14 for communicating with the in-plane satellite 10 ahead, one ISL 14 for communicating with the in-plane satellite 10 behind, and one each for communicating with the nearest satellite 10 in the adjacent orbit planes.

Figure 2A:
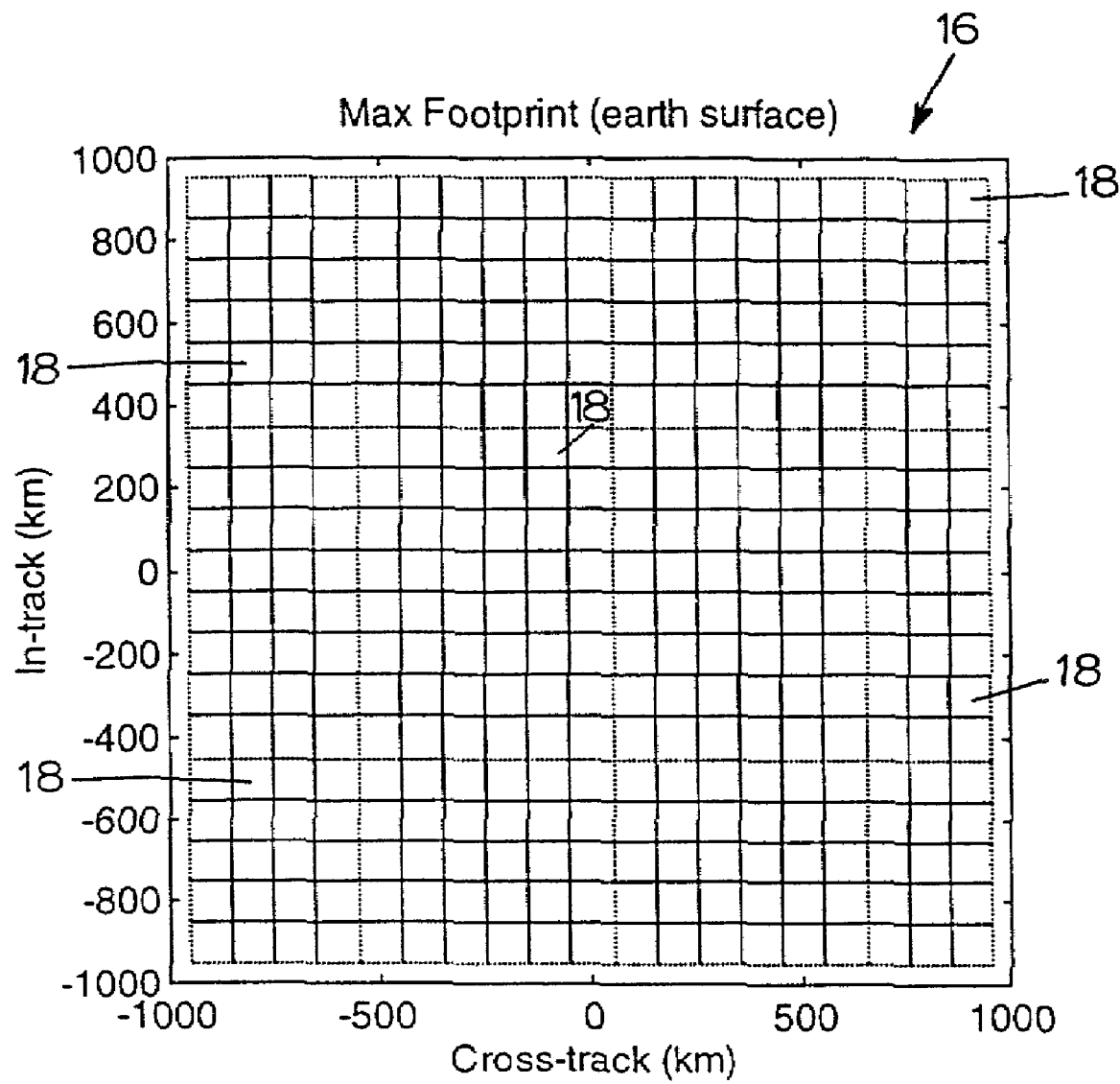
FIG. 2A is a grid illustrating a satellite footprint on the surface of the earth in kilometers.
Figure 2B:
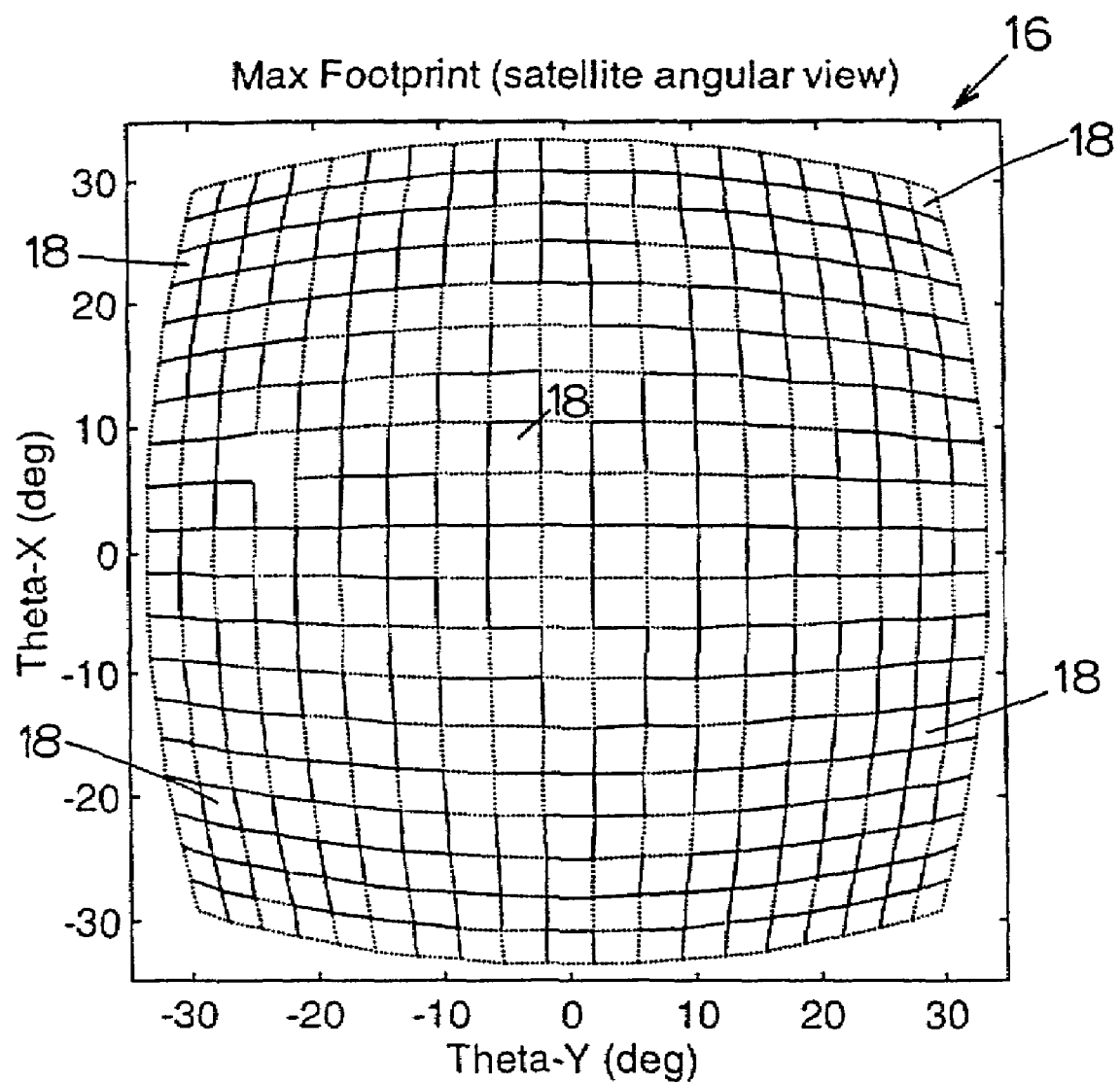
FIG. 2B is a grid illustrating a satellite footprint on the surface of the earth in satellite angular coordinates.

A satellite footprint 16 on the surface of the earth in kilometers is illustrated in FIG. 2A and in satellite angular coordinates in FIG. 2B. In the preferred embodiment, the maximum satellite footprint 16 is approximately eighteen by eighteen degrees square in earth-central angle centered at the subsatellite point. The footprint 16 is divided into approximately equal surface area cells 18, which are aligned in columns in the in-track direction (i.e., the direction the satellite is traveling). The columns are curved in angle space to match the transformation from linear cell columns on the earth. The curvature of columns in angle space is implemented in an uplink antenna 20 (see FIG. 3). Square cells 18 are shown. However, a person of ordinary skill in the art will readily appreciate that other arrangements, such as hexagonal cells, are well within the scope of the present invention.

Figure 3:
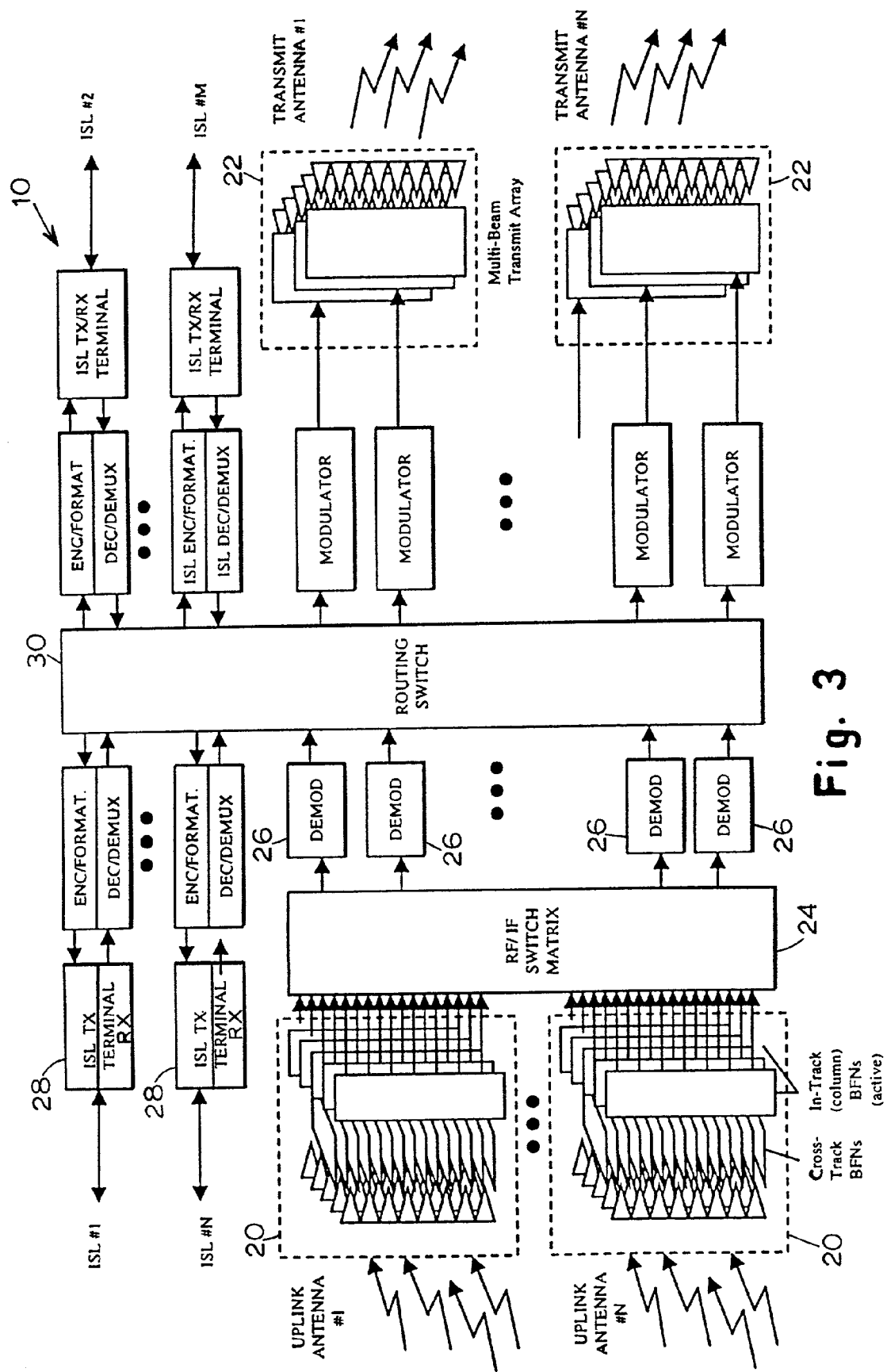
FIG. 3 is a block diagram illustrating a satellite, suitable for use as a satellite depicted in FIG. 1.

A satellite 10, suitable for use as the satellite 10 depicted in FIG. 1, is illustrated in FIG. 3. Preferably each satellite 10 employs a communications payload comprising: an active beamforming uplink antenna system 20 using linear cell tracking; one or more phased-array downlink antennas 22 generating multiple independently steerable downlink beams steered in conjunction with time division multiple-access (TDMA) downlink formatting; a radio frequency (RF) switch matrix 24 interconnecting uplink beams to demodulators 26; one or more intersatellite links 28 preferably interconnecting adjacent satellites 10; and an on-board routing switch 30 for routing data packets between the uplink antennas 20, downlink antennas 22, and intersatellite links 28. Preferably, the system operates within a fixed frequency band allocation on uplink and downlink. The satellites 10 provide a regenerative repeater and autonomous routing function which demodulates and routes data packets based on destination addressing within the packet format.

Each adaptive beamforming uplink antenna 20 is an antenna using commandable amplitude/phase weights to form the beam shapes and scanning positions over time. Each phased-array downlink antenna 22 is an antenna implemented as a planar array with per-element steering controls. Of course, any antenna providing a plurality of beams, each of which is independently steerable, can be utilized.

The RF switch matrix 24 is an interconnect matrix of RF input signals to RF output signals, wherein an input signal can be attached to one or more output ports. The RF switch matrix 24 allows variable numbers of uplink resources (channels/timeslots) to be connected to the uplink antenna 20 beam ports. The RF switch matrix 24 can be commanded in response to both traffic demand changes and satellite 10 motion ("ratcheting"). The downlink phased-arrays 22, data queuing, TDMA burst accesses and pointing of the downlink beams implements variable data rates to downlink cells 32 (See FIGS. 7A and 7B). Hence, the system can accommodate variable bandwidth to earth-fixed regions rather than fixed bandwidth per cell.

The on-board routing switch 30 is a packet-switch which reads header information inserted by a source terminal to determine the destination of the packets. As a packet is received at a satellite 10, either from an uplink 20 or an intersatellite link 28, an on-board address translation is performed to determine whether the packet is to be routed to a downlink 22 beam or to another outbound inter-satellite link 28. Multiple intersatellite links 28 are maintained between satellites 10 in the constellation to provide data routing for calls spanning more than a single satellite footprint 16. The routing tables which determine this address translation are updated as users register with a network management center.

Each satellite 10 in the constellation employs a yaw-steering program (or, optionally, a roll-yaw combined steering program) to compensate for earth rotation and linearize the track of the ground cells 18 as viewed in satellite 10 angular space (i.e., compensate for the cross-track angular motion of earth users—see FIG. 4). Yaw and/or roll-yaw steering consists of adjusting the attitude (or orientation) of the satellite 10 body along its yaw and/or roll axes. Yaw steering compensates the relative motion of points on the earth in the cross-track angular direction by rotating the satellite 10 to a predefined angle ($\theta$). The angle is a function of the satellite 10 location in its orbit. When the satellite 10 is steered in this manner, the angular track of a ground point will follow a fixed trajectory through angle space. All ground points which enter the satellite's footprint 16 at the same relative location from the subsatellite point will follow this trajectory. This is not true if the satellite's yaw orientation is fixed relative to the orbit velocity vector or if the yaw orientation follows any other steering program.

Figure 5:
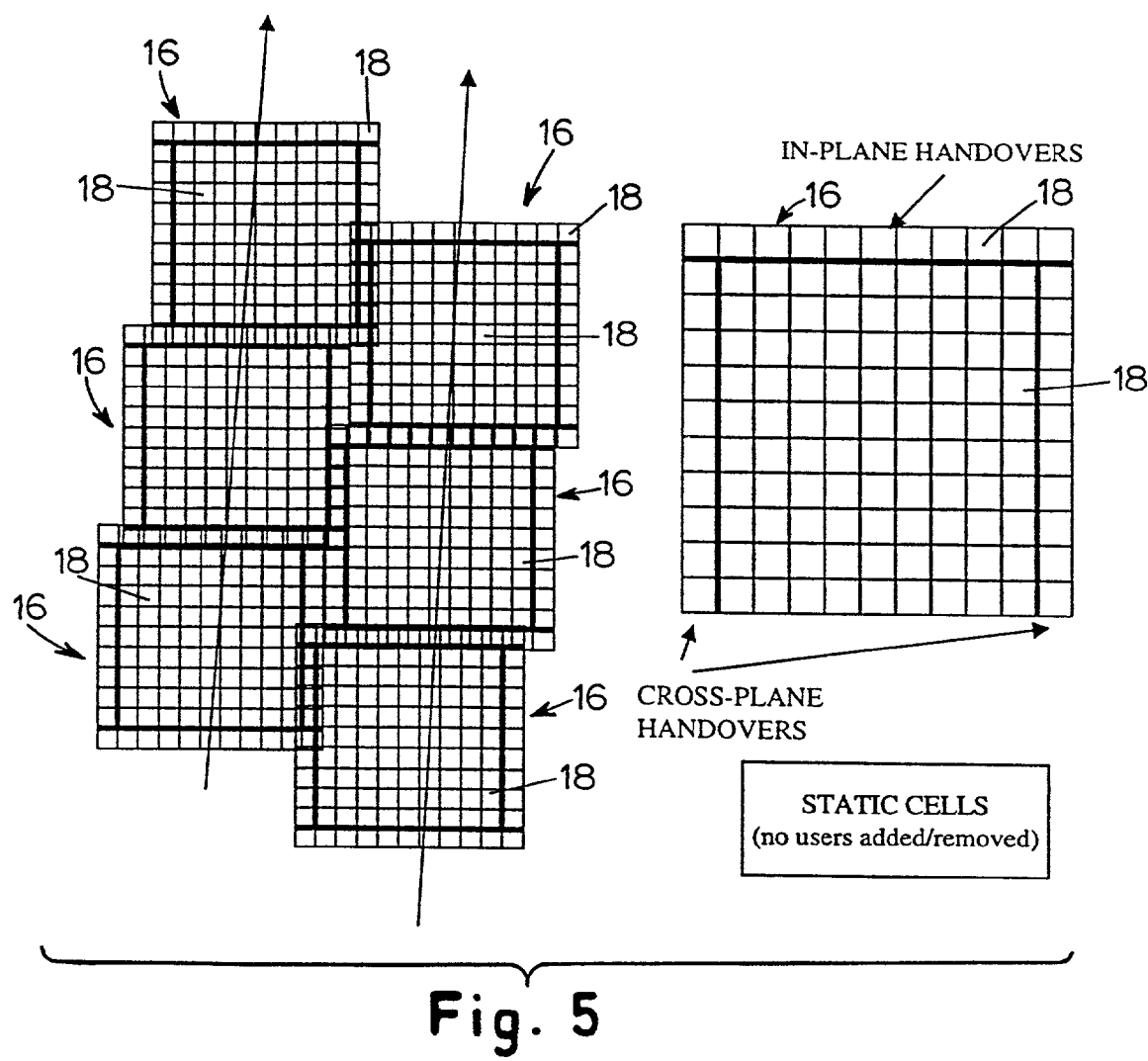
FIG. 5 is a grid layout illustrating a footprint scheme and user assignment/handover regions.

The footprint scheme and user assignment/handover concepts are illustrated in FIG. 5. Preferably, the region affected by handovers is restricted to the top row and the east/west extreme columns of the footprint. The communications system divides the visible footprint 16 of the satellite 10 into discrete cells 18. An uplink cell 18 is contiguous geographic area on the surface of the earth which exists for the duration of a satellite 10 pass. The duration of a satellite 10 pass is a fixed period of time defined by the orbit altitude and the footprint extent or elevation angle mask. For example, using a low earth orbit of 1400 km altitude and elevation angles >38 degrees this time period is approximately 5 minutes. The uplink cells 18 are defined at handover time at the "top" of the footprint 16. All user terminals within the cell region may share uplink resources (channels, timeslots, etc.) for the duration of the existence of the cell 18. At the time the cell 18 is defined, the resources (channels/timeslots, etc.) which the users may utilize for their existing connections are also defined.

Figure 6A:
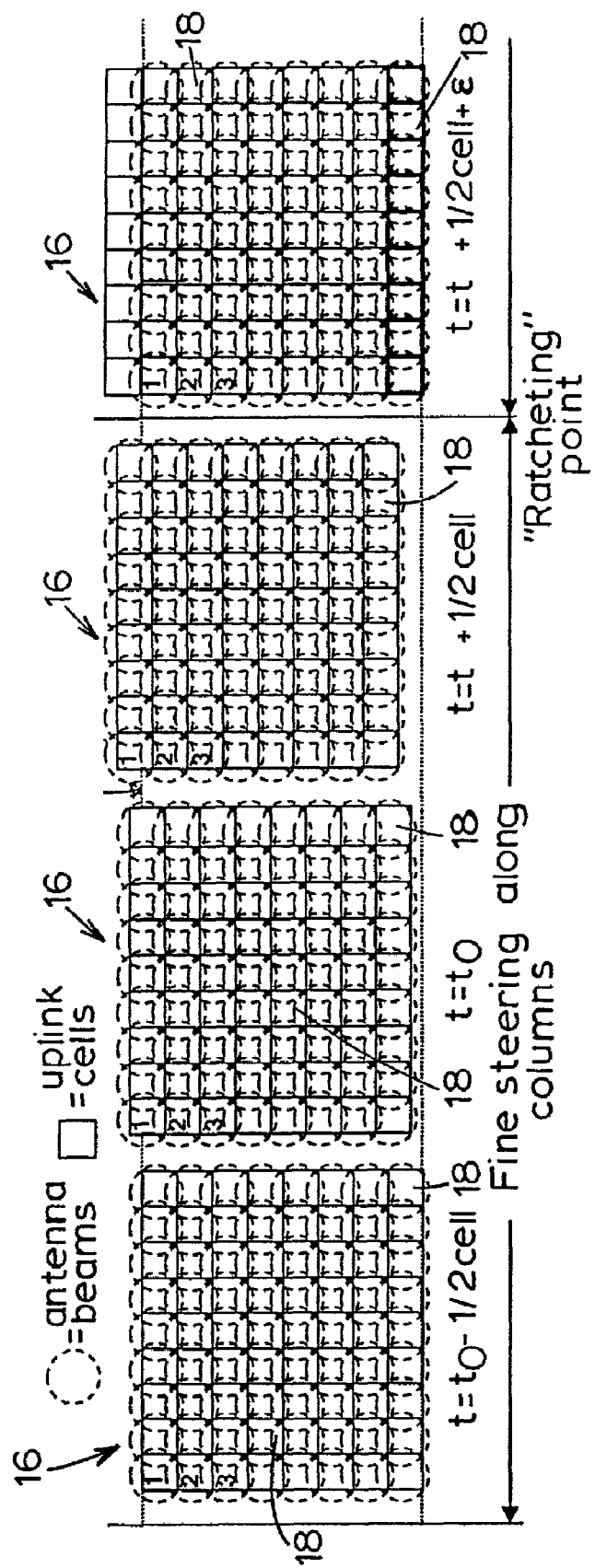
FIG. 6A is a timeline illustrating ratcheting of uplink cell coverage.
Figure 6B:
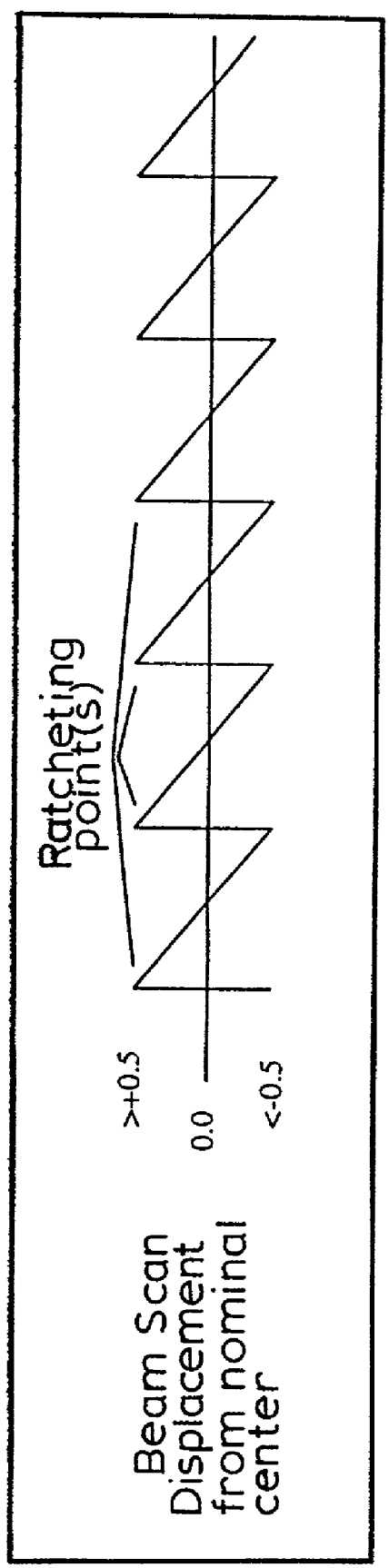
FIG. 6B is a timeline illustrating ratcheting of beam scan displacement.

Users on the earth are grouped into uplink cells 18 (contiguous regions on the earth) at the time of handover to an oncoming satellite 10. This assignment stays fixed for the duration of an entire satellite 10 pass (i.e., until the next satellite handover). The uplink antenna 20 is preferably implemented using a specific arrangement of the active controls to provide linear "ratcheting" of the uplink cells 18 within the footprint 16. An uplink cell 18 progresses through the footprint 16 and stays within a single column of antenna beams. Active control is provided such that the column beams are steerable over at least +/−0.5 cells 18 worth of displacement from nominal position, to compensate for a fixed period of satellite 10 motion corresponding to one cell 18 width. The RF switch matrix 24 is reconfigured to keep the uplink channel resources assigned to an uplink cell 18 attached to the correct beam port of the uplink antenna 20 as the antenna beam is both fine-steered and "ratcheted" (see FIG. 6A and 6B) from cell 18 to cell 18. If the uplink antenna 20 is implemented as a phased-array with fixed Rotman lens or Butler matrix beamforming networks following the array, the roll steering function, and optionally the linear "ratcheting" function of the uplink antenna 20, may be implemented using active control of phase shifters (or time-delay units) applied to each element of the phased array, eliminating the column "ratcheting" controls. A Rotman lens is an antenna device which performs a specific transformation from the array feeds and produces a set of fixed beams in angle space. A single planar Rotman lens is most often implemented in a stripline structure with two stacks of planar lenses required to create a full two-dimensional field of output fixed beams. The Butler matrix transformation is similar to the Rotman lens. A single planar Butler matrix is most often implemented as a tree of hybrid dividers with fixed phase shifts, and two stacks of planar matrices are required to create a full two-dimensional field of output fixed beams.

The system operates by assigning earth-fixed users into the appropriate uplink cell 18 at the top row of the footprint 16 during satellite 10 handover. The footprints 16 of the satellites 10 are overlapped by at least one cell 18 in the in-track direction to allow for handover of users from satellite 10 to satellite 10. As the satellites 10 move the equivalent of one cell 18 in-track, assignment of users into the top row of cells 18 is completed and the set of users assigned to this row remains fixed throughout the satellite 10 pass. Throughout the pass, all the rows of cells 18 in the footprint are "ratcheted" downward at fixed time intervals (see FIG. 6A and 6B). A beamforming antenna 20 is implemented on the uplink which has beam ports arranged in curved columns (see FIG. 2B). Each beam port is steerable in the in-track direction by at least +/−0.5 cells 18 of displacement to allow for the one row's worth of cell 18 motion. The fine steering of the uplink column-beamforming antenna 20 compensates for motion between ratcheting intervals. The RF switch matrix 24 interconnecting the uplink antenna 20 ports to the demodulators 26 is commanded at the ratcheting intervals to preserve the resource assignment to the fixed uplink cells 18.

Preferably, the uplink antenna 20 scans in one dimension only. Ratcheting refers to the fact that the beams are steered through a single scan range, say from +0.5 to −0.5 relative to the nominal beam centers, and are then commanded to point backwards from −0.5 to +0.5 in a single instant. The beams essentially retrace the same steering path repeatedly (see FIG. 6A and 6B). This accomplishes tracking of a fixed cell 18 on the earth for a small period of time (such as 15 seconds). At the "ratcheting" point, the uplink cell 18 on the earth is tracked by a new antenna beam for another 15 seconds. All resources associated with this uplink cell 18 are then interconnected to the new uplink antenna 20 beam port by commanding the RF switch matrix 24 simultaneously with the uplink antenna 20 "ratcheting". This repeats until the cell is outside the field of view of the satellite footprint 16.

The system maintains resource allocation (e.g., frequency, polarization, timeslot) by creating uplink cell 18 assignments which are fixed and do not change due to the relative position of the satellite 10 and the earth terminal. If the satellite 10 implemented fixed uplink beams, the beam patterns would "move over" the user terminals. Cellular systems which operate in this fashion often need to re-assign the user resources (frequencies, timeslots, etc.) to limit interference and maintain capacity. This also requires schemes which communicate the new assignments to the users. All of these considerations reduce the capacity of the system.

If the users are grouped into a fixed cell region on the earth, the cell being defined in the present invention at the time the users are handed over from one satellite to another, then the uplink antenna 20 is designed to provide a series of steerable antenna beams along "columns" in angle space. Within a column, each beam's scan region overlaps the other by at least ½ a scan range. Thus, as the satellite 10 moves, all the beams track in unison along the column direction until the scan range limit has been reached. At this point, the "ratcheting" event occurs. The beam's scanning is reset toward the top of the footprint 16 and the beam fine-steering (tracking) continues. At the ratcheting point, the users in a cell 18 are conceptually shifted down one row (a new cell 18 added at the top of the footprint 16, and users in an old cell 18 handed over to other satellites 10 at the bottom of the footprint 16). "Shifted down" one row means that a different uplink antenna 20 beam is covering the same set of users, and their signals are appearing at a different physical port at the uplink antenna 20 output. This change is made invisible to the users, however, because the resources assigned to the cell 18 are re-connected to the new uplink antenna 20 port by commanding the RF switch matrix 24 to a different connectivity.

Cross-track motion may carry a user outside the footprint 16 during the in-track pass. Uplink cells 18 in the footprint 16 columns at the extreme left side of the footprint 16 (e.g., the west side during an ascending pass) may accept new users throughout the pass. Similarly, uplink 18 cells in the footprint 16 columns at the extreme right side of the footprint 16 (e.g., the east side during an ascending pass) may handoff current users. Persons of ordinary skill in the art will readily appreciate that similar concepts apply for a descending pass and for cross-seam (i.e., ascending vs. descending plane) footprint management of cross-plane handovers.

Figure 7A:
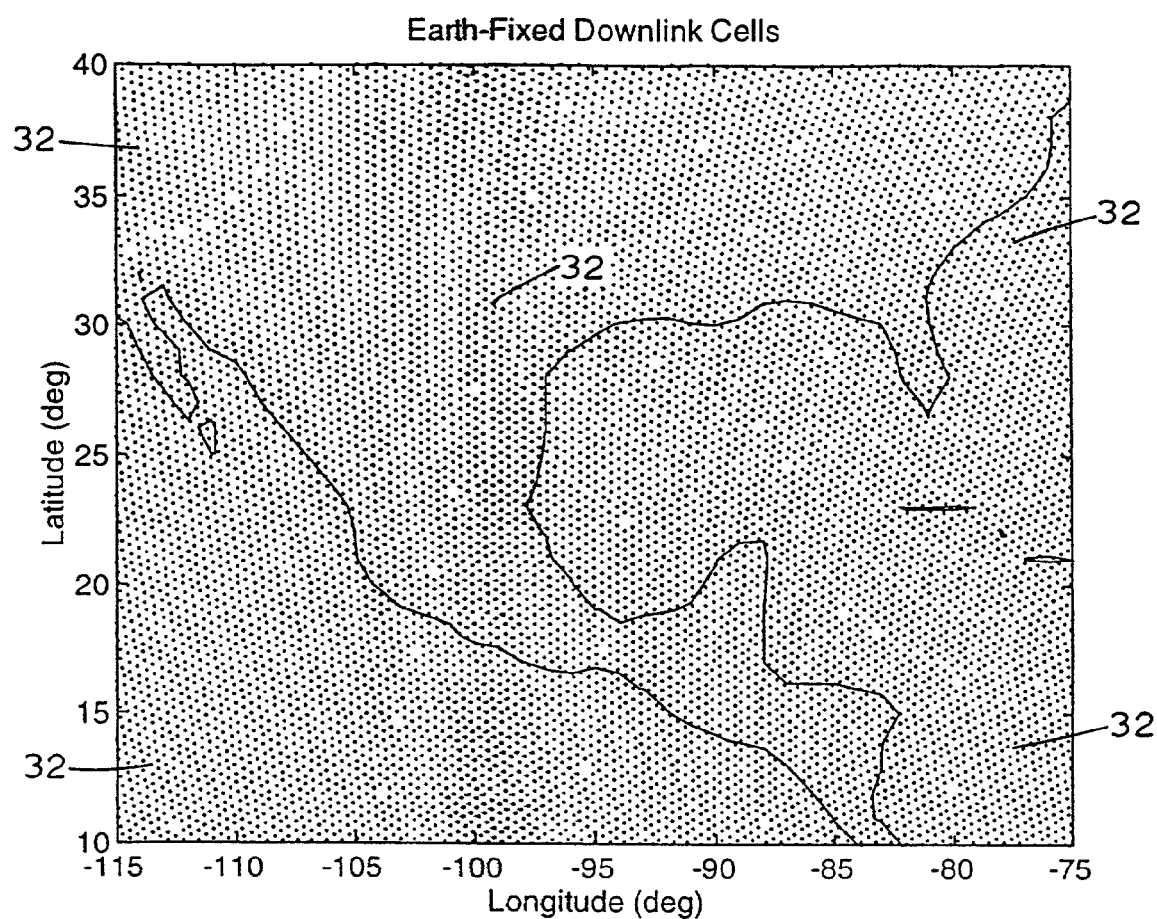
FIG. 7A is a map illustrating earth-fixed downlink cell center points.
Figure 7B:
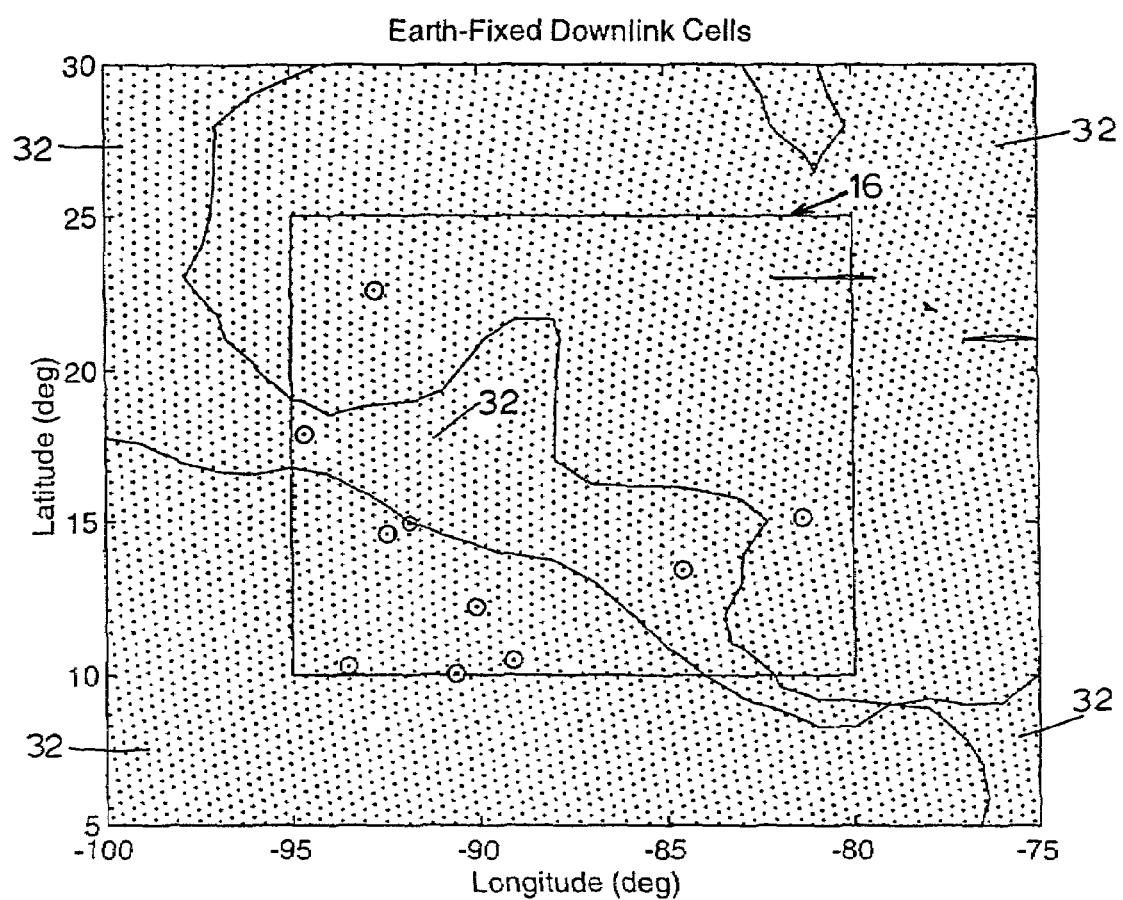
FIG. 7B is a more detailed map illustrating earth-fixed downlink cell center points, the satellite footprint, and downlink beans at one instant in time.

Downlink cells 32 are earth-fixed contiguous geographical areas on the surface of the earth which do not change with time (See FIGS. 7A and 7B). The earth is tiled using a pre-determined earth-fixed grid. Users in a single downlink cell 32 may be assigned to multiple uplink cells 18 (i.e., split across two columns of an uplink antenna 20) at handover time. Downlink coverage is maintained by using multiple-beam phased-array downlink antennas 22 with independently steerable beams.

Part of the destination address for user data packets can be a cell identifier or cell address. The steering of each beam is data-driven by the addressing of packets. Data to be transmitted from a satellite 10 to a downlink cell 32 is grouped together in a common queue and then bursted to the downlink cell 32 in a contiguous burst. The downlink antenna 22 beam must be pointed to the downlink cell 32 center for the duration of the burst. A single downlink beam can serve numerous downlink cell 32 locations by steering consecutive bursts to different cells in a TDMA fashion. The downlink array beams are re-steered in conjunction with the downlink cell address for each burst. The multiple beams are driven by a downlink scheduler which monitors the data in queues for downlink cells 32 and selects which downlink cells 32 are to be serviced. Since the schedule is not fixed but driven by the actual data in the queues, the number of bursts sent to a given downlink cell 32 may vary according to the traffic demand. There is no fixed rate assigned to any downlink cell 32 in the footprint 16. The phased-array antenna 22 enables the TDMA service by having multiple independently steerable beams. However, persons of ordinary skill in the art will readily appreciate that other steerable antenna systems could be employed.

The satellite 10 maintains its own position and orientation information. The fixed (latitude, longitude) centers of the downlink cells 32 which the satellite 10 is responsible for (i.e., those within its footprint 16 or field-of-view) are communicated on a schedule from a network management center. When a downlink cell 32 is required to change ownership from one satellite 10 to another, all users within the downlink cell 32 are handed over to the new satellite 10 simultaneously. The (latitude, longitude) centers are periodically translated to angular pointing commands at a rate commensurate with the desired pointing accuracy and the motion of the satellite 10. The angular pointing command for a given downlink cell 32 is sent to a downlink antenna 22 phased-array controller at the same time a data burst for that downlink cell 32 is being prepared for transmission. The downlink antenna 22 array is steered to the new downlink cell 32 position and the burst is transmitted to the ground terminal receivers. Terminals are responsible for demodulating, decoding, and identifying packets within the burst destined for their users.

Optionally, the downlink cells 32 are essentially contiguous with the uplink cells 18. In this alternate embodiment, one or more downlink cells 32 are defined as subcells within an uplink cell 18. Accordingly, downlink cells 32 may be defined along with the uplink cells 18 at handover time. Data within the system would be addressed to terminal destinations via (latitude, longitude) of the receiving terminal (or an equivalent earth-fixed grid with fine resolution of approximately 1 km$^2$). Satellites 10 would route data based on their geometry relative to the destination (latitude, longitude) coordinate or grid address. At the final destination satellite 10, a table lookup or geometry calculation would define which destination addresses belong within a given downlink cell 32, and these packets would be sent to a common queue for that cell 32. The downlink antenna 22 would then operate with multiple TDMA bursted downlink beams as previously described.

In summary, persons of ordinary skill in the art will readily appreciate that an improved satellite communication device and system has been provided. By using yaw and roll-yaw steering to linearize angular track of uplink cells 16; one-dimensional linear "ratcheting" in the uplink antenna 20 to maintain resource allocation of uplink cells 16 along the antenna columns; phased-array downlink antennas 22 which can track earth-fixed downlink cells 32 while compensating for the yaw (or roll-yaw) satellite 10 steering; and variable rate TDMA service among downlink cells 32 in the footprint 16, system overhead for performing new resource allocations between satellite 10 handovers is minimized. Systems employing the present invention will enjoy reduced resource management overhead and increased system capacity by holding uplink cell 16 resource assignments constant over an entire satellite 10 pass. This invention greatly simplifies the uplink antenna 20 implementation as compared to a system operating with earth-fixed uplink cells and provides flexible bandwidth/capacity assignment of both uplink and downlink resources to earth locations via the linear cell "ratcheting", uplink RF peaking switch, and data-driven variable-TDMA downlink phased-arrays.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A communication device for use in conjunction with a plurality of communication devices in a communications network, comprising:
    a receiving antenna coupled to a circuit, employing one-dimensional linear ratcheting of rows to maintain resource allocation of uplink cells along antenna coupled to a circuit columns for capturing a first receive signal comprised of a plurality of received data packets.

2. A communication device as recited in claim 1 further comprising a first transmitting antenna capable of generating a first independently steerable transmit beam comprised of a plurality of transmitted data packets.

3. A communication device as recited in claim 1 further comprising an interdevice receiver for receiving a first plurality of interdevice data packets from another communication device in the plurality of communication devices.

4. A communication device as recited in claim 1 further comprising an interdevice transmitter for transmitting a second plurality of interdevice data packets to a communication device in the plurality of communication devices.

5. A communication device as recited in claim 1 further comprising a routing switch for routing data packets from the receiving antenna to a transmitting antenna, from the receiving antenna to an interdevice transmitter, from an interdevice receiver to the transmitting antenna, and from the interdevice receiver to the interdevice transmitter.

6. A communication system comprising:
    a first communication device generating a first footprint comprising a first plurality of beams arranged in a first plurality of rows and first plurality of columns;
    a second communication device generating a second footprint comprising a second plurality of beams comprising a second plurality of rows and a second plurality of columns so that one of said first plurality of rows overlaps one of said second plurality of rows; and
    a beam forming network within said first communication device linearly ratcheting said first plurality of rows so that each of said first plurality of rows is successively included within the second footprint.

7. A communication system as recited in claim 6 wherein said first communication device comprises a satellite.

8. A communication system as recited in claim 6 wherein said second communication device comprises a satellite.

9. A method of operating a communication system comprising:
    generating a first footprint comprising a first plurality of beams arranged in a first plurality of rows and first plurality of columns;

generating a second footprint comprising a second plurality of beams comprising a second plurality of rows and a second plurality of columns so that one of said first plurality of rows overlaps one of said second plurality of rows; and linearly ratcheting said first plurality of rows so that each of said first plurality of rows is successively included within the second footprint.

10. A method as recited in claim 9 wherein ratcheting is performed in response to a movement of a first communication device in a first direction.

11. A method as recited in claim 10 wherein ratcheting is performed in a second direction opposite the first direction.

12. A method as recited in claim 9 wherein ratcheting is performed while maintaining relative column positions.

13. A method of operating a communication system comprising:

forming a first beam footprint and a second beam footprint, said first beam footprint comprised of a plurality of cells, said cells arranged in a first plurality of rows and a first plurality of columns;

overlapping at least one of said first plurality of rows and one of said second plurality of rows;

ratcheting said first plurality of rows linearly downward.

14. A method as recited in claim 13 wherein ratcheting comprises controlling a motion of a communications device using yaw steering.

15. A method as recited in claim 13 wherein ratcheting comprises controlling a motion of a communications device using yaw-roll steering.

16. A method of operating a communication system having a first and second communication device comprising:

dividing a footprint of the first communication device into discrete cells;

moving the first communication device in a travel direction relative to said cells;

grouping the discrete cells into columns in the travel direction and rows in a direction perpendicular to the travel direction;

linearly ratcheting the discrete cells along the columns so that the cells maintain their respective columns and channel resources until handing over; and handing over one of the rows of cells to the second communication device.

17. A method as recited in claim 16 wherein prior to handing over, sharing a row of discrete cells with the second communication device.

18. A method as recited in claim 16 wherein moving the first communication device comprises moving the first communication device in a yaw direction.

19. A method as recited in claim 16 wherein moving the first communication device comprises moving the first communication device in a yaw and roll direction.

20. A method of operating a communication system comprising:

generating a footprint comprising a plurality of beams arranged in a plurality of rows and plurality of columns;

assigning users to respective rows and allocating respective beam ports thereto; and simultaneously commanding an RF matrix to change said beam ports through linear ratcheting to maintain the users within respective columns and in a different row while maintaining a resource allocation.

* * * * *